United States Patent

Kanematsu et al.

Patent Number: 5,926,191
Date of Patent: Jul. 20, 1999

[54] METHOD AND APPARATUS FOR PRINTING

[75] Inventors: Daigoro Kanematsu, Kawasaki; Naoji Otsuka; Kentaro Yano, both of Yokohama; Kiichiro Takahashi, Kawasaki; Hitoshi Nishikori, Inagi; Osamu Iwasaki, Tokyo; Hidehiko Kanda, Kawasaki, all of Japan

[73] Assignee: Canon Kabushiki Kaisha, Tokyo, Japan

[21] Appl. No.: 08/961,215

[22] Filed: Oct. 30, 1997

[30] Foreign Application Priority Data

Jan. 31, 1997 [JP] Japan .................................. 9-018871

[51] Int. Cl.$^6$ ........................................................ B41J 2/01
[52] U.S. Cl. ........................................................ 347/5; 347/6
[58] Field of Search ................................. 400/61, 62, 70, 400/76, 120.02, 120.09; 347/5, 6, 7, 14

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,604,654 | 8/1986 | Sakurada et al. | 358/298 |
| 4,608,577 | 8/1986 | Hori | 346/140 R |
| 4,686,538 | 8/1987 | Kouzato | 346/1.1 |
| 4,692,773 | 9/1987 | Saito et al. | 346/1.1 |
| 4,713,746 | 12/1987 | Watanabe et al. | 346/1.1 |
| 4,723,129 | 2/1988 | Endo et al. | 346/1.1 |
| 4,740,796 | 4/1988 | Endo et al. | 346/1.1 |
| 4,860,026 | 8/1989 | Matsumoto et al. | 346/1.1 |
| 5,453,775 | 9/1995 | Eguchi et al. | 347/176 |
| 5,568,173 | 10/1996 | Leenders et al. | 347/96 |
| 5,679,142 | 10/1997 | McInerney et al. | 347/86 |

FOREIGN PATENT DOCUMENTS

| | | |
|---|---|---|
| 388978A2 | 9/1990 | European Pat. Off. . |
| 401023A2 | 12/1990 | European Pat. Off. . |
| 627323A2 | 12/1994 | European Pat. Off. . |
| 699535A2 | 3/1996 | European Pat. Off. . |
| 54-56847 | 5/1979 | Japan . |
| 59-12370 | 7/1984 | Japan . |
| 59-138461 | 8/1984 | Japan . |
| 60-71260 | 4/1985 | Japan . |

*Primary Examiner*—John Hilten
*Attorney, Agent, or Firm*—Fitzpatrick, Cella, Harper & Scinto

[57] ABSTRACT

In the case of printing in three-value level utilizing two kinds of inks mutually different densities for one color (higher and lower density inks), it is assumed that a reflection density of a region having a predetermined area when solid print is performed only by the lower density ink, and that when solid print is performed only by the higher density ink are expressed ODt and ODn, respectively. Since the granular appearance of the ink dots is expressed in terms of reflection density of one dot, the granular appearance of a lower density ink dot at a portion of image formed only by the lower density ink dots and the granular appearance of a higher density ink dot at a portion of image formed by the higher and lower density ink dots are expressed in terms of values of ODt and (ODn−ODt) divided by the number of pixels included the above region, respectively. Accordingly, by making the reflection density ODt to be approximately one half of the reflection density ODn, the granular appearance produced by the lower density ink dot at the highlighted portion and the granular appearance produced by the higher density ink dot at the portion where the higher density ink dots scattered in the lower density ink dots can be made substantially equal to each other. For this purpose, it is preferable that a dye concentration of the lower density ink is to be about one fourth of that of the higher density ink.

10 Claims, 6 Drawing Sheets

| KIND OF INK | DYE CONCENTRATION(%) |
|---|---|
| YELLOW | 2.90(%) |
| MAGENTA (HIGH) | 2.25(%) |
| CYAN (HIGH) | 2.80(%) |
| BLACK | 3.40(%) |
| MAGENTA (LOW) | 0.60(%) |
| CYAN (LOW) | 0.70(%) |

METHOD AND APPARATUS FOR PRINTING

This application is based on Patent Application No. 9-018,871 filed Jan. 31, 1997 in Japan, the content of which is incorporated hereinto by reference.

BACKGROUND OF THE INVENTION

FIELD OF THE INVENTION

The present invention relates generally to an apparatus and a method for performing printing. More specifically, the invention relates to a printing apparatus and a printing method for performing gradation or gray scale printing on a printing medium employing at least two kinds of inks of one color with mutually different density.

DESCRIPTION OF THE RELATED ART

As currently major printing system, there are a thermal transfer type printing system transferring an ink on an ink ribbon onto a printing medium by a thermal energy, an ink-jet printing system performing printing by ejecting a liquid, such as an ink to deposit on the printing medium, and the like.

Amongst, the ink-jet type printing system has features of capability of high speed printing, low noise generation during printing operation, easiness of color printing with employing a plurality of colors of inks for printing, and capability of desired printing on a plane paper without requiring special fixing process. Furthermore, by employing at least two kinds of inks with different density for one color (e.g. cyan), high gray scale printing can be facilitated.

FIG. 4 shows an example of setting of ink ejection amounts of respective of higher density ink and a lower density ink for a predetermined unit image with respect to a multi-valued input signal level (0 to 255) upon formation of three-value level image employing two kinds of inks of one color and different densities (respectively referred to as higher density ink and lower density ink). In general, when three-value level image is formed utilizing two kinds of inks of different densities, gray scale expression is performed by presence and absence of lower density ink dot within a region A in the drawing. At a predetermined point B, 100% ejection of the lower density ink is performed. In a region C, the lower density ink dot of 100% ejection at the B point is gradually replaced with higher density ink dot to finally perform 100% ejection of higher density ink dot in the input signal level of "255", and thus to perform three-value level gray scale or gradation expression.

The region A where the signal value is low, is the case, such as for forming a highlighted portion in a general photograph image or the like. Granular feeling of the image in the highlighted portion is lowered at lower reflection density ("Optical Density" or "OD" value) of the image formed by one lower density ink droplet. However, the signal region exceeding a point B is a region where a few higher density ink dots are scattered in the lower density ink dots. Therefore, in such region, if OD values of the higher density ink dots and the lower density ink dots are significantly different, granular appearance of the image is increased.

Namely, in the prior art, no consideration has been given in that, upon performed multi-valued printing employing a plurality of kinds of inks of one color with different densities, granular appearance by the lower density ink dots formed by the lower density ink in the low gray scale region, and granular appearance by the higher density ink dots formed by the higher density ink in a transition region where lower density ink dots are changed into the higher density ink dots, are reduced with good balance.

SUMMARY OF THE INVENTION

The present invention has been worked out in view of the problems set forth above. Therefore, it is an object of the present invention to make it possible to perform high quality gradation or gray scale printing upon performing multi-valued printing employing a plurality of kinds of inks of one color with different densities, with restricting granular appearance in a highlighted portion and also restricting granular appearance by higher density dots in a transition region.

In a first aspect of the present invention, a printing apparatus comprises:

means for performing printing employing a plurality of kinds of printing agents respectively different reflection densities on a print medium in one color; and:

means for causing the means to print with satisfying the following expression:

$$[(C+1-N)/(1.25 \times C)] \times OD1 \leq ODN \leq [(C+1-N)/(0.83 \times C)] \times OD1$$

wherein ($N=2$ to $C$)
assuming that number of kinds of printing agents is $C$ and reflection densities upon depositing predetermined amount of the printing agents on a predetermined print medium are respectively OD1, OD2, ... ODN, ..., ODC in descending order.

In a second aspect of the present invention, a printing method comprises the steps of:

performing printing employing a plurality of kinds of printing agents respectively different reflection densities on a printing medium in one color; and causing printing to be performed with satisfying the following expression:

$$[(C+1-N)/(1.25 \times C)] \times OD1 \leq ODN \leq [(C+1-N)/(0.83 \times C)] \times OD1$$

wherein ($N=2$ to $C$)
assuming that number of kinds of printing agents is $C$ and reflection densities upon depositing predetermined amount of the printing agents on a predetermined print medium are respectively OD1, OD2, ... ODN, ..., ODC in descending order.

In any one of these aspects, a plurality of printing agents of different colors may be employed and a plurality of kinds of printing agents having mutually different reflection densities on the print medium may be employed in at least one of the colors.

The printing agent may be an ink.

Here, a printing head may be employed in the printing means or step for performing printing by ejecting an ink as the printing agent toward the print medium.

The printing head may include electrothermal transducer element generating a thermal energy for causing film boiling in the ink as an energy for causing ejection of the ink.

In a third aspect of the present invention, a printing apparatus comprises:

means for providing a plurality of kinds of inks respectively different reflection densities on a print medium in one color, the plurality of kinds of inks being satisfying the following expression:

$$[(C+1-N)/(1.25 \times 2C)] \times D1 \leq DN \leq [(C+1-N)/(0.83 \times 2 \times C)] \times D1$$

wherein ($N=2$ to $C$)

assuming that number of kinds of inks is C and concentration of the various density levels of inks are respective D1, D1, ... DN, ..., DC in descending order; and means for performing printing employing the plurality of kinds of inks.

Here, the providing means may have means for providing a plurality of inks of different colors, the means may provide a plurality of kinds of inks having mutually different reflection densities on the print medium at least one of the colors.

A printing head may be employed in the printing means for performing printing by ejecting an ink toward the print medium.

The printing head may include electrothermal transducer element generating a thermal energy for causing film boiling in the ink as an energy for causing ejection of the ink.

In a fourth aspect of the present invention, a printing method comprises the steps of:

providing a plurality of kinds of inks respectively different reflection densities on a print medium in one color, the plurality of kinds of inks being satisfying the following expression:

$$[(C+1-N)/(1.25\times 2C)]\times D1 \leq DN \leq [(C+1-N)/(0.83\times 2\times C)]\times D$$

wherein (N=2 to C)
assuming that number of kinds of inks is C and concentration of the various density levels of inks are respective D1, D1, ... DN, ..., DC in descending order; and performing printing employing the plurality of kinds of inks.

Here, a plurality of inks of different colors may be employed and a plurality of kinds of inks having mutually different reflection densities on the print medium may be employed in at least one of the colors.

A printing head may be employed for performing printing by ejecting an ink toward the printing medium.

The printing head may include electrothermal transducer element generating a thermal energy for causing film boiling in the ink as an energy for causing ejection of the ink.

In a fifth aspect of the present invention, a printed product comprises:

a print medium having a surface to be deposited with ink thereon; and a plurality of dots deposited on the surface of the print medium by employing a plurality of kinds of inks respectively different reflection densities on a print medium in one color, the plurality of kinds of inks being satisfying the following expression:

$$[(C+1-N)/(1.25\times 2C)]D1 \leq DN \leq [(C+1-N)/(0.83\times 2\times C)]\times D1$$

wherein (N=2 to C)
assuming that number of kinds of inks is C and concentration of the various density levels of inks are respective D1, D1, ... DN, ..., DC in descending order, and the plurality dots forming an image.

It should be appreciated that, throughout the disclosure and claims, the wording "print" means not only forming of meaningful information, such as character, drawing and so forth, but also forming images, patterns and the like in broader sense.

Also, the wording "print medium" represents not only a paper typically used in printing apparatus, but also cloth, plastic film, metal plate and the like which may receive the printing agent. However, in the following description of the preferred embodiments, the printing medium is exemplarily represented by "paper".

DESCRIPTION OF THE PREFERRED EMBODIMENT

The present invention will be explained in detail with reference to the accompanying drawings.
First Embodiment
(1) Description of Printing Apparatus FIG. 1 shows an example of general construction of a color ink-jet printing apparatus as a printing apparatus, to which the present invention is applicable.

Figure 1:
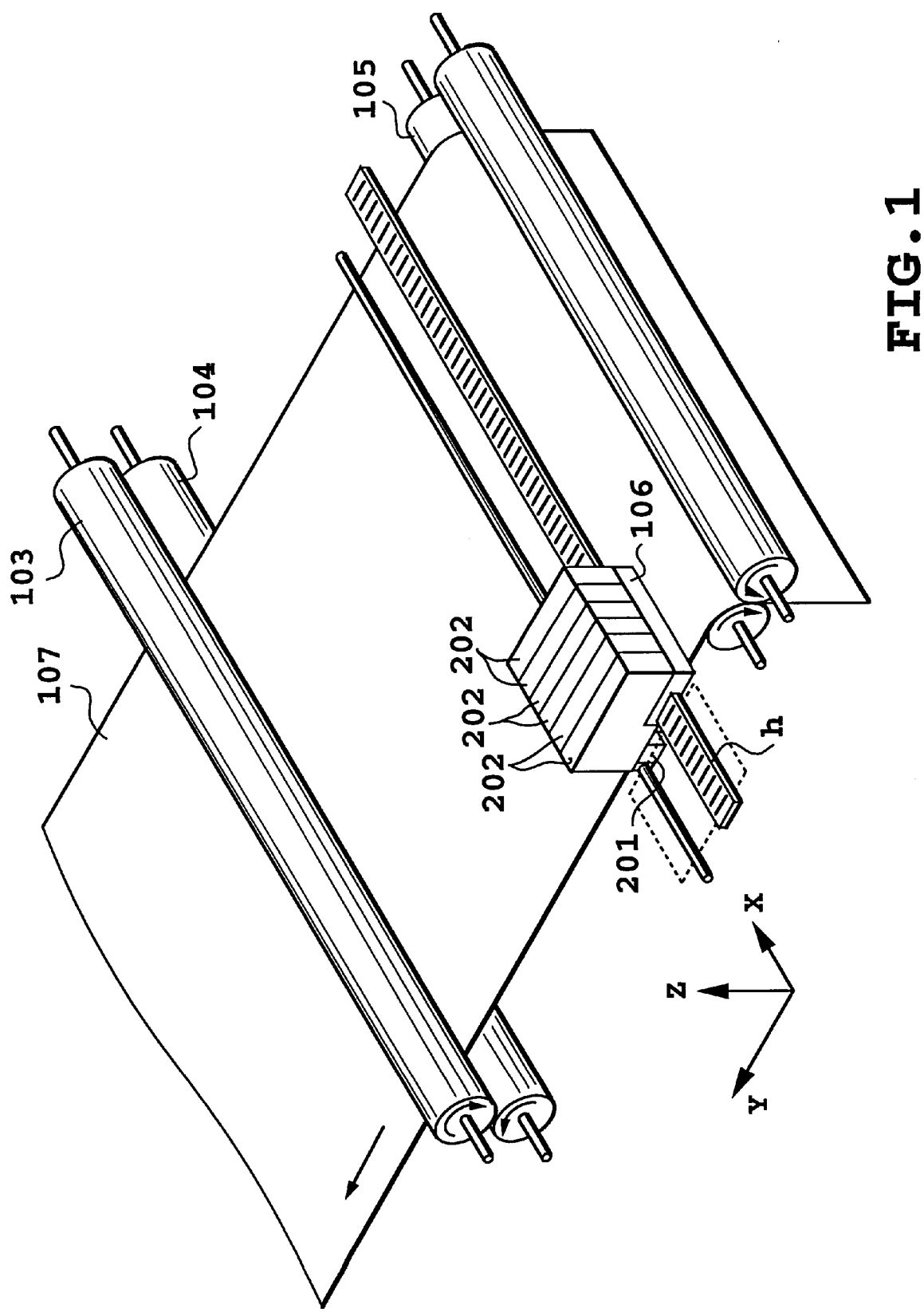
FIG. 1 is a perspective view showing general construction of a color ink-jet printing apparatus as a printing apparatus, to which the present invention is applicable.

In FIG. 1, the reference numeral 202 denotes head cartridges. Each head cartridge 202 is constructed with an ink tank for storing an ink and a printing head 201 for ejecting the ink. In the shown embodiment, six head cartridges 202 are provided for respective of black and yellow colors, and further for respective two kinds, i.e. higher and lower densities of cyan and magenta colors. Of course, the kinds of colors is not limited to those of the shown example. Also, it is possible to provide a plurality of inks of mutually different color densities for a desired color.

On the other hand, concerning form of the printing head or the ink tank, it is possible to make the printing head and the ink tank completely integrated so that whole head cartridge is to be exchanged when the ink is consumed out and no ink is remained. In the alternative, it is possible to make the printing head and the ink tank separable to permit exchange of only ink tank. In the further alternative, instead of providing the head cartridge with integrating the printing head and the ink tank, it is also possible to provide a separately formed ink tank at a location away from the printing head and to connect the ink tank with the printing head through a flexible tube or the like to supply the ink. Furthermore, in the last mentioned case, it is possible to employ the ink tanks respectively storing inks preliminarily differentiated densities. Alternatively, it is also possible to provide only ink tank storing the higher density ink, and to provide means for diluting the higher density ink to form the lower density ink, in an ink supply passage to the printing head provided for ejecting the lower density ink. In addition, instead of providing the head cartridge for each color and kind of the ink as in the shown example, it is possible to provide an integrated printing means having an ejecting portion which can eject a plurality of colors and/or densities of inks.

The reference numeral 103 denotes a paper feeder roller which clamps a printing paper 107 together with an auxiliary roller 104 and rotates in a direction shown by arrow to feed the printing paper 107 in a direction of Y direction (sub-scanning direction) in the drawing. The paper feeding roller 103 is also cooperated with a roller 105 to perform a function for restricting a printing surface of the printing paper 107 opposing a printing head 201, flat. The reference numeral 106 denotes a carriage which mounts six head cartridges 202 or printing heads 201 and moves in an X direction (main-scanning direction) in the drawing, while printing is performed. The carriage 106 is controlled to be set at a home position which is shown by broken line in the drawing, when printing operation is not performed or when recovery operation of the printing head is to be performed.

At the position to perform recovery operation, a capping means for capping the face (ejection opening forming face, in which ink ejection openings are provided) of the printing head opposing the paper and a recovery unit for performing so-called recovery operation, such as removing ink of increased viscosity or bubble in the printing head in the capped condition. On the other hand, at a side portion of the capping means, a cleaning or wiping blade and the like is provided. The cleaning blade or the like is supported in a manner that the cleaning blade can be projected toward the printing head to contact with the ejection opening forming face. By this, after recovery operation, the cleaning blade is moved to be projected into the motion passage of the printing head to wipe out unnecessary ink droplet, stain and so on the ejection opening forming face associated with motion of the printing head.

Before a printing operation, the carriage 106 positioned at the shown position (home position) is moved in the X direction in response to incoming of a print start command. On the other hand, the printing elements provided in the printing head 201 are driven to perform printing on the printing paper in a region having a width corresponding to a range where the printing elements are arranged. Once printing along the main-scanning direction of the carriage up to the end of the paper is completed, the carriage 106 returns to the home position to perform printing operation again with shifting in the X direction. On the other hand, after completion of one cycle of main-scan and before initiation of next main-scanning cycle, the paper feeder roller 103 is rotated in the direction shown by arrow to perform paper feeding in Y direction for a predetermined amount. Thus, main-scanning for printing and sub-scanning for paper feeding are performed alternately to complete necessary printing for one printing paper. The operation of ejecting the ink from the printing head is performed under control by a not shown print control means.

It should be noted that it is possible to perform printing operation even in return path for returning the carriage 106 to the home position after main-scan in X direction for improving printing speed, instead of performing printing operation only in motion in one direction of the carriage (forward path).

(2) Description for Printing Head

Figure 2:
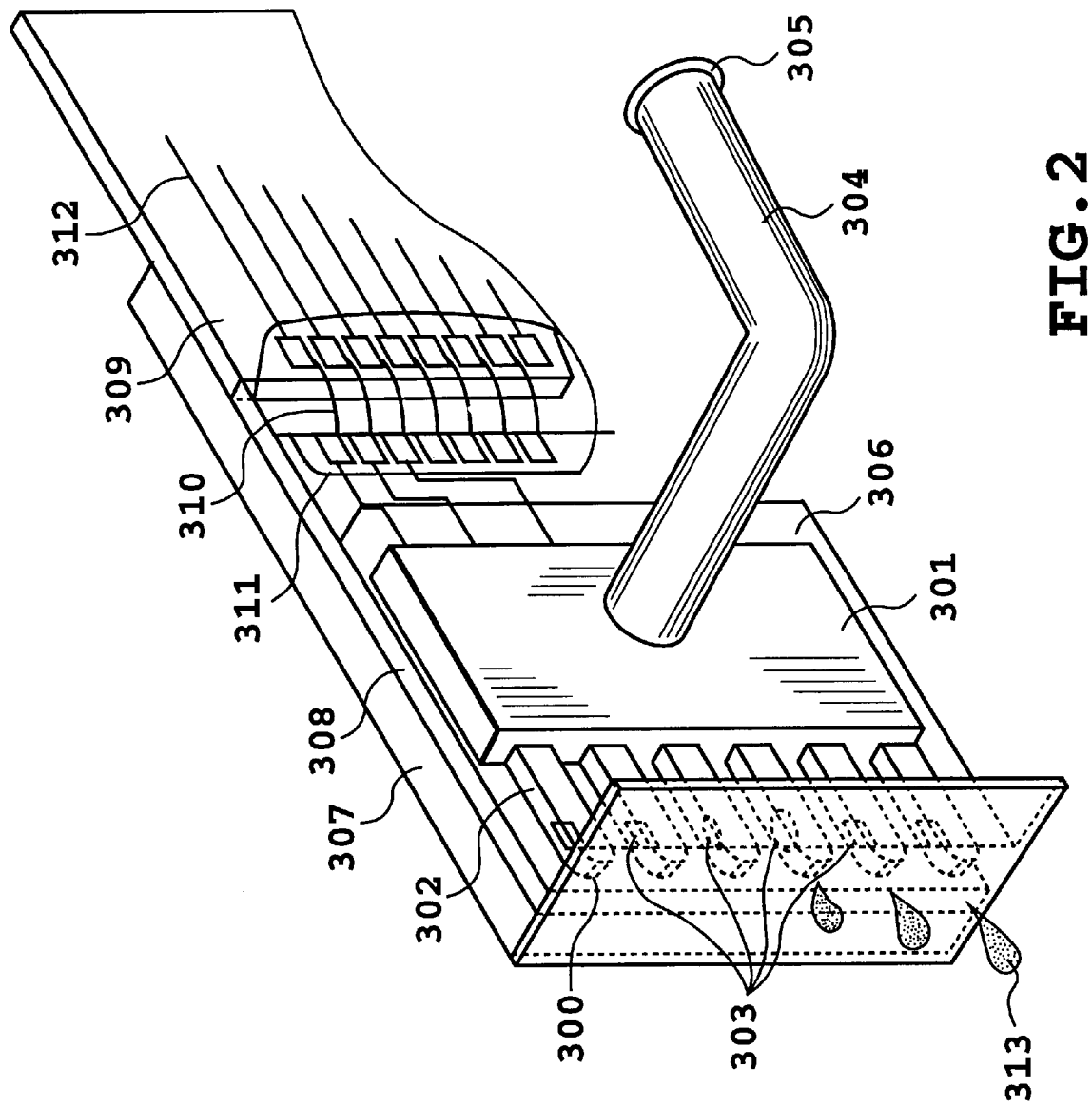
FIG. 2 is a perspective view diagrammatically showing the major part of the printing head applicable for the printing apparatus of FIG. 1.

FIG. 2 is a perspective view diagrammatically showing the major part of a printing head applicable for the apparatus shown in FIG. 1.

In a printing head 201, a plurality of ejection openings 300 are formed with a predetermined pitch. Along a wall surface of each liquid passage 302 communicating a common liquid chamber 301 and each ejection opening 300, an element (e.g. electrothermal transducer element) 303 for generating an energy (e.g. thermal energy) to be used for ejecting the ink is arranged. The element 303 and its driving circuit and the like are formed on a silicon substrate utilizing a semiconductor fabrication technology. A silicon plate 308, in which these elements, driver circuit and electric wiring are built-in, is bonded and supported on an aluminum plate 307 for heat radiation. On the other hand, a circuit connecting portion 311 and a printed board 309 on the silicon plate 308 are connected by a quite thin wire 310 so that the signal from the main body of the printing apparatus is received through a signal circuit 312.

The liquid passage 302 and the common liquid chamber 301 are formed in a plastic cover 306 formed by injection molding. The common liquid chamber 301 is connected to the ink tank via a joint pipe 304. In the joint pipe 304 or an ink introducing portion of the ink tank, an ink filter 305 is provided so that the ink, from which impurity or the like is appropriately filtered out, is supplied into the common liquid chamber.

The ink supplied from the ink tank and temporarily stored in the common liquid chamber 301 penetrates into the liquid passage 302 by capillary phenomenon to form meniscus at the ejection opening 300 to maintain the liquid passage 302 in filled condition. At this time, an electric power is supplied to the electrothermal transducer element 303 via an electrode (not shown) to be heated. Thus, the ink on the element 303 is abruptly heated to generate bubble within the liquid passage 302. The ink is thus ejected in a form of a droplet 313, for example, through the ejection opening 300 by expansion of the bubble.

(3) Description of Control System

Figure 3:
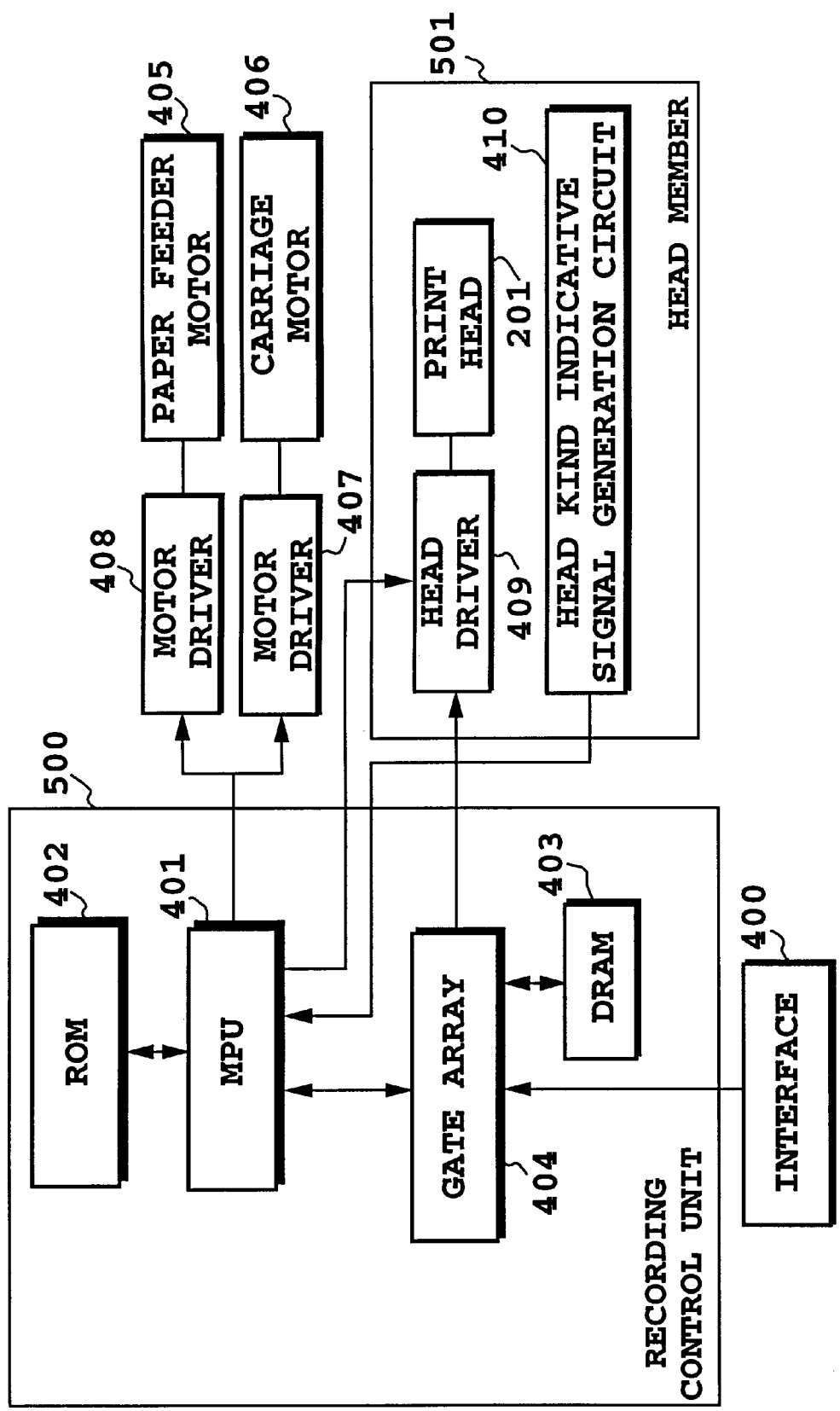
FIG. 3 is a block diagram showing an example of construction of a control system for controlling respective portion of the printing apparatus of FIG. 1 including control of the printing operation.

FIG. 3 shows an embodiment of construction of a control system for controlling respective portion of the apparatus shown in FIG. 1, including printing operation. In FIG. 3, reference numerals 500 and 501 denote a recording control unit and a head member, respectively. Reference numeral 400 denotes an interface for performing transmission and reception of printing data or so forth with a not shown host system. The reference numeral 401 denotes a MPU forming a primary control portion of the system, reference numeral 402 denotes ROM strong fixed data, such as a program corresponding to a control procedure to be executed by MPU, and reference numeral 403 denotes a dynamic RAM (DRAM) for storing various data (control signal for printing operation, printing data to be supplied to a printing head 201, and so on). It is possible to store number of printing dots, number of exchanging or so on of the head or the cartridge.

The reference numeral 404 denotes a gate array for performing control of supply of the printing data to be supplied the printing head 201, and for controlling transfer of data between the interface 400, MPU 401 and DRAM 403. The reference numeral 406 denotes a carriage motor forming a driving source for moving the carriage in X direction of FIG. 1, and reference numeral 405 denotes a paper feeder motor forming a driving source for feeding the paper in Y direction in FIG. 1. The reference numerals 407 and 408 are motor drivers for driving the carriage motor 406 and the paper feeder motor 405, respectively, and reference numeral 409 denotes a head driver for driving the printing head 201.

(4) Description of Printing Method

A printing method for performing printing in three-value level will be described utilizing two kinds of inks of mutually different densities for one color (higher density ink and lower density ink).

Figure 4:
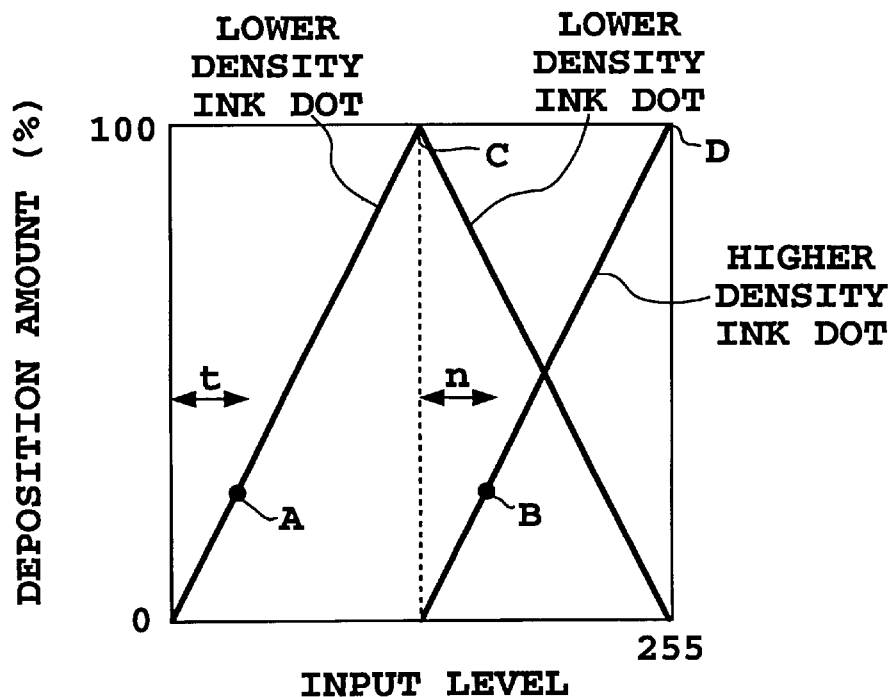
FIG. 4 is an explanatory illustration showing a relationship of ink depositing amount of higher density ink and lower density ink with respect to an input signal level in the first embodiment of the present invention.

With reference to FIG. 4, in the shown embodiment, by reducing granular appearance of the lower density ink dot in a region t and granular appearance of the higher density ink dots in the lower density dots in a region n in good balance, the granular appearance of the highlighted portion of the image and the granular appearance of the level transition portion of the higher and lower inks can be reduced to form a high quality image without rough appearance.

In general, the granular appearance of the ink dot formed on the predetermined printing medium can be expressed by reflection density (OD) per unit area. Namely, when the same number of lower density ink dots and higher density dots are formed in the same condition on the same printing medium, granular appearance of the higher density ink becomes relatively higher for higher reflection density.

The point A in FIG. 4 is present in the region t where a print operation is performed by using only the lower density ink and where the lower density ink dots are scattered. Here, the point is assumed to be formed by four dots of the low density ink per sixteen pixels, for example. The point B is present in the region n where the higher density ink dots are scattered in the low density ink dots, which point is consisted of four dots of the higher density ink and twelve dots of the lower density ink per sixteen pixels. Here, in the point B, the higher density ink dots and the lower density ink dots are arranged without overlapping. Solid print of 100% is effected by means of sixteen dots of low density ink and high density ink per sixteen pixels, for the points C and D, respectively.

Figure 5:
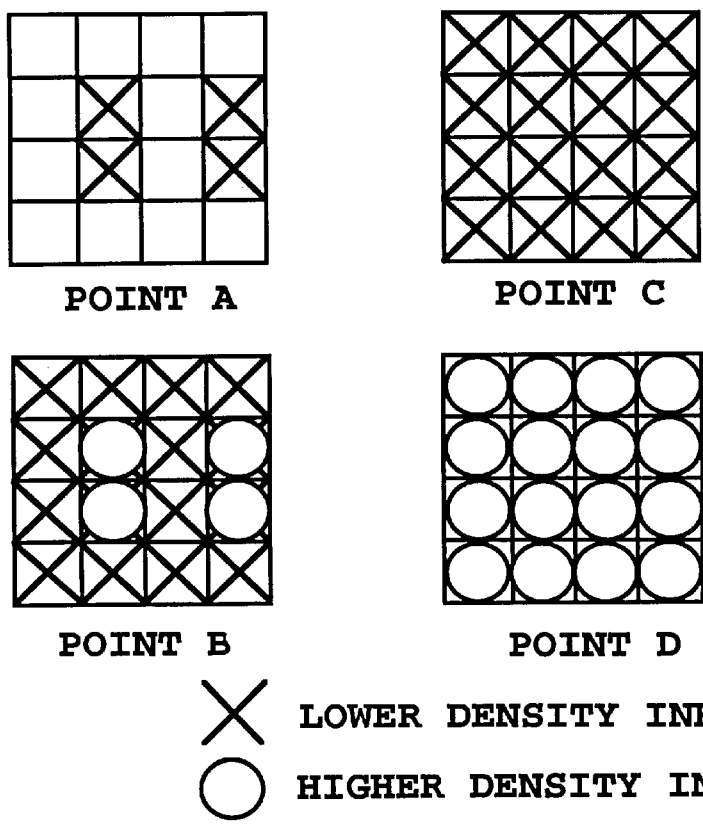
FIG. 5 is an explanatory illustration showing one example of manner of the ink dot formation at points A to D of FIG. 4.

FIG. 5 is a diagrammatic illustration showing manner of forming lower density ink dot and/or higher density ink dots at the points A to D in FIG. 4.

A reflection density of the region printed only by the lower density ink dots at the point C is assumed to be ODt, and the reflection density in the region printed only by the higher density ink dots is assumed to be ODn. Since the granular appearance of the ink dots is expressed by reflection density of one dot, the granular appearance of respective inks at points A and B are expressed as follows:

Point A: ODt/16

Point B: ODn/16−ODt/16

Accordingly, the granular appearance of respective inks at the points A and B can be made substantially equal to each other by making the reflection density of the lower density ink dot at the point C to be approximately one half of the reflection density of the higher density ink dot at the point D.

Density of Ink dye

Assuming that the reflection density of 16 dots/16 pixels of lower density ink is ODt and the reflection density of 16 dots/16 pixels of higher density ink is ODn, the dye concentrations of the higher density ink and the lower density ink are determined as one of the ways to satisfy ODn=2× ODt.

Figures 6, 7:
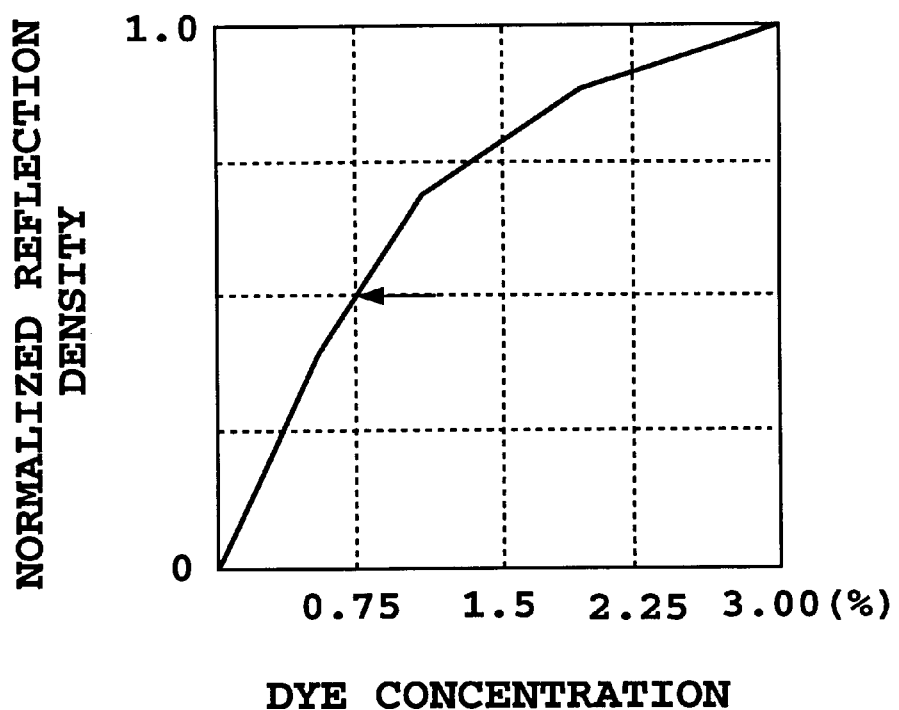
FIG. 6 is an explanatory illustration showing dye concentration of the ink employed in the first embodiment.
FIG. 7 is an explanatory illustration showing a relationship between an ink dye concentration and normalized reflection density.

For example, FIG. 6 shows dye concentration of six kinds of inks employed in the apparatus of FIG. 1. On the other hand, FIG. 7 shows a relationship of a normalized reflection density OD upon 100% ejection with respect to a predetermined dye concentration of the ink. As can be clear from FIG. 7, it should be appreciated that dye concentration has to be about one fourth in order to make the reflection density of the ink to be one half. Namely, as shown in FIG. 6, in case of the embodiment shown in FIG. 1, for the magenta and cyan, for which two kinds of inks, i.e. higher density ink and the lower density ink are used, the dye concentration of the lower density ink should be about one fourth of that of the higher density ink.

Use Range of Reflection Density and Dye Concentration of Ink

Binarizing process is performed by the control system shown in FIG. 3 so that, among a multi-valued signal to be input by the control system as shown in FIG. 3, e.g. "0" to "255", a range of "0" to "255/2≈127" is the range to be printed by only the lower density ink, a range of "128" to "254" is a range where both of the higher density ink dots and the lower density ink dots are present, and the input signal "255" is a range to be printed only by the higher density ink. Binarizing process may be performed by a per se known system, such as dither method, error diffusion method and the like.

Namely, quantization is performed so that the input signal level is divided into two ranges, i.e. "0" to "127" and "128" to "255", and gray scale or gradation for the former value range is formed by presence and absence of the lower density ink dots, and gray scale expression for the latter value range is formed by using both of the lower density ink and the higher density ink and then, a printing operation is performed so that the reflection density of the solid image only by the lower density ink becomes approximately one half of the solid image of only high density ink. This can be realized by adjusting the dye concentration of the ink so that two kinds of, i.e. higher density and lower density of, inks, in which the lower density ink has the one fourth of dye concentration of the higher density ink, are used.

By this, the granular appearance of the lower density ink dots in the highlighted portion of the input signal level in a range of about "0" to "50" and the granular appearance of the higher density ink dots in the transition portion from the lower density ink to the higher density ink in the input signal level of the range of about "128" to "178" can be reduced substantially equally.

It should be appreciated that, for obtaining the desired effect using the two kinds of, i.e. the higher density and the lower density of, inks for one color as in the shown embodiment, it is not required to strictly adjust to achieve the reflection density of the solid image formed only by the lower density ink, to be one half of the reflection density of the solid image formed only by the higher density ink, or to achieve the dye concentration of the lower density ink to be one fourth of the higher density ink in one color, but has to be within a predetermined range.

According to the experiments performed by the inventors, when the reflection density of the higher density ink dot at 100% deposition is assumed to be OD1 and the reflection density of the lower density ink dot at 100% deposition is assumed to be OD2, by setting OD2 in a range of 40 to 60% of OD1, or when the dye concentration of the higher density ink is assumed to be D1 and the dye concentration of the lower density ink is assumed to be D2, by setting D1 in a range of 20 to 30% of D1, effect can be obtained without any significant problem in the actually printed image. Namely, by satisfying at least one of the following expressions:

Reflection Density: $0.4 \times OD1 \leq OD2 \leq 0.6 \times OD1$

Dye Concentration: $0.2 \times D1 \leq D2 \leq 0.3 \times D1$ satisfactory effect can be obtained.

Second Embodiment

In the second embodiment of the present invention, explanation will be given for the case where the inks of one color are three kinds of inks of mutually densities i.e. higher density, medium density and lower density (hereinafter referred to as higher density ink, medium density ink and lower density ink).

Figure 8:
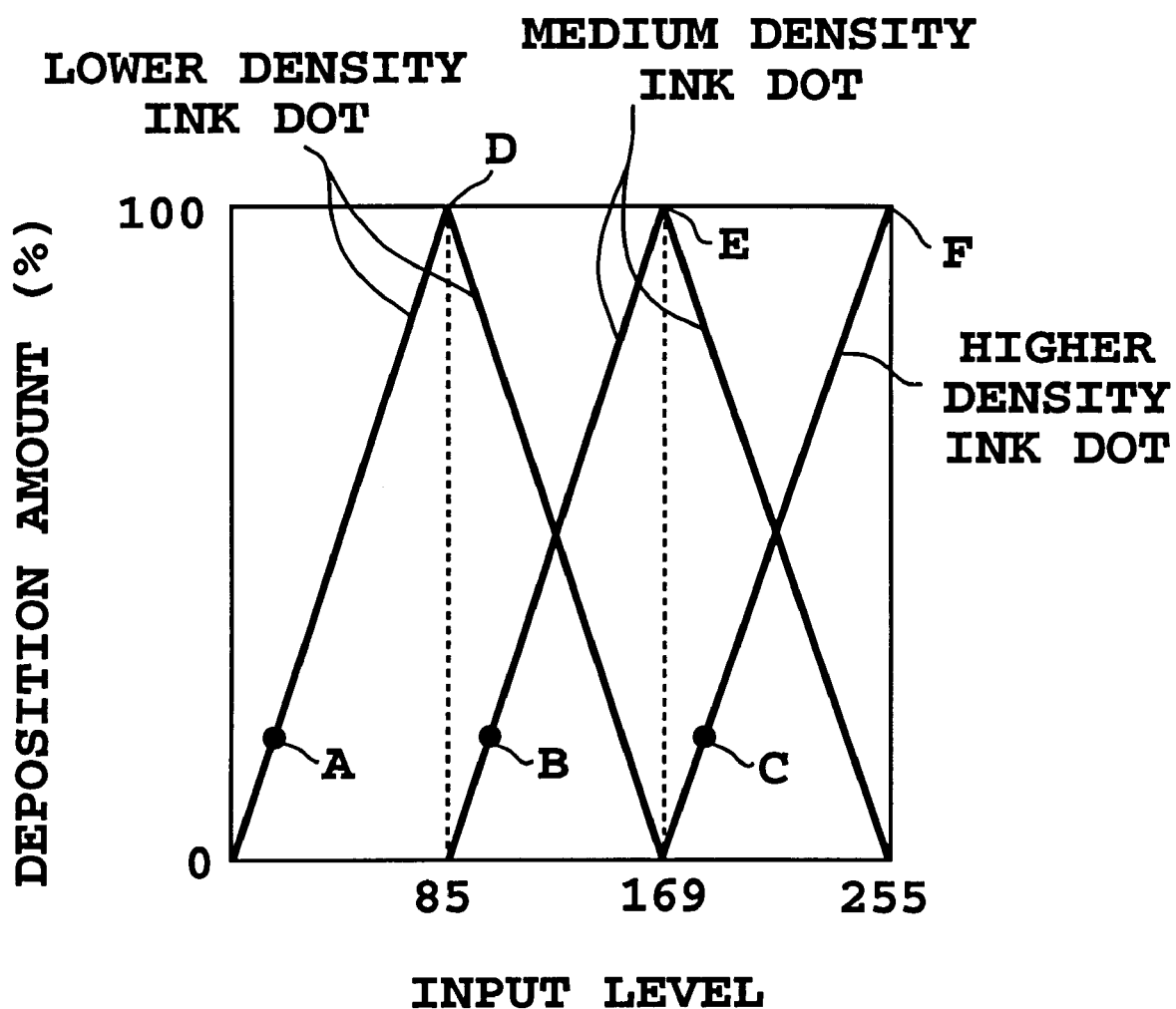
FIG. 8 is an explanatory illustration showing a relationship of ink ejecting amount of higher density ink, medium density ink and lower density ink with respect to an input signal level in the second embodiment of the present invention.

FIG. 8 shows the ink deposition amount in the case of four-value level printing with respect to the input signal level of "0" to "255", for example, with employing the higher density ink, the medium density ink and the lower density ink. When four value level printing is to be performed, it is desirable to appropriately reduce granular appearance of the lower density ink dot in a region up to the point A, granular appearance of the medium density ink dot in a region from the point D to the point B, and granular appearance of the higher density ink dot in a region from point E to the point C.

In FIG. 8, the point A is present in a region printed only by the lower density ink. Here, it is assumed that the point A is the point consisted of four lower density ink dots per sixteen pixels, for example. The point B is located in a region where the medium density ink dots are scattered in the lower density ink dots, which point B is assumed to be consisted of four medium density ink dots and twelve lower density ink dots in an unit area of sixteen dots. The point C is located in a region where the higher density ink dots are scattered in the medium density ink dots, which point C is assumed to be consisted of four higher density ink dots and twelve medium density ink dots in an unit area of sixteen dots. In FIG. 8, solid image of 100% is formed by means of lower density ink, the medium density ink and the higher density ink for the points D, E and F, respectively.

The shown embodiment has been worked out for reducing the granular appearance of the lower density ink dots in the vicinity of the point A, the medium density ink dots in the vicinity of the point B and the higher density ink dots in the vicinity of the point C, the granular appearance due to reflection density, in good balance.

For this purpose, in the shown embodiment, assuming that the reflection density of 16 dots/16 pixels of the lower density ink is ODt, the reflection density of 16 dots/16 pixels of the medium density ink is ODc, and the reflection density of 16 dots/16 pixels of the higher density ink dot is ODn, and in consideration of manner of ejection of respective kinds of inks of FIG. 8, dye concentrations of respective of the higher density ink, the medium density ink and the lower density ink are determined to establish ODn=3×ODt and ODc=2× ODt, for example.

At first, quantization process is performed by a control system similar to that illustrated in FIG. 3 so that, with respect to the input multi-valued signal of "0" to "255", printing is performed only by the lower density ink in a range of "0" to "255/3" (≈"84"), printing is performed by ink dots of the lower density ink and the medium density ink in a range of "86" to "168", printing is performed by ink dots of the medium density ink and the higher density ink in a range of "170" to "254", and at the values "169" and "255", printing is performed only by the medium density ink and the higher density ink, respectively. Quantization can be performed by any known method, such as dither method or error diffusion method. FIG. 8 shows the manner of ink deposition amount of three kinds of inks, i.e. higher, medium and lower density inks for the multi-valued signal "0" to "255".

Then, assuming that the reflection density of the lower density ink dot at the point A is ODt', the reflection density of the medium density ink dot at the point B is ODc' and the reflection density of the higher density ink dot at the point C is ODn', granular appearance at respective points can be expressed as:

granular appearance at point A: ODt' granular appearance at point B: ODc'−ODt'=2×ODt'− ODt'=ODt' granular appearance at point C: ODn'−ODt'=3×ODt'−2× ODt'=ODt'

Thus, granular appearance (reflection density) at respective points becomes substantially uniform.

Namely, by dividing the input signal level of "0" to "255" into three ranges, quantization is performed in such a manner that gradation or gray scale expression of the range of lower density level is done by presence and absence of the lower density ink dots, gradation expression of the range of medium density level is done using the lower density ink dots and the medium density ink dots, and gradation expression of the range of higher density level is done using the medium density ink dots and the higher density ink dots. And then, printing is performed so that the reflection density of the "solid" image by the medium density ink becomes approximately double of the reflection density of the "solid" image of the lower density ink, and the reflection density of the "solid" image by the higher density ink becomes approximately triple of the reflection density of the "solid" image of the lower density ink. In order other words, printing is performed so that the reflection densities of the "solid" images of the lower density ink and the medium density ink becomes respectively approximately one third and two third of the reflection density of the "solid" image of the higher density ink. In order to realize the reflection densities by adjusting dye concentration of the inks, the higher density ink, the medium density ink and the lower density ink, which dye concentration of the lower density ink and the medium density ink for one color becomes one sixth and one third of the dye concentration of the higher density ink, respectively, may be used.

When printing is performed using three kinds of inks having different density, the granular appearance in respective transition portion of respective densities can be reduced substantially uniformly. Thus, smooth image with no roughness can be printed at all gradation level.

In order to obtain the desired effect even in the case where three kinds of inks, i.e. higher, medium and lower density inks, of one colors are employed, it is not necessary to strictly adjust proportion with respect to the reflection density of the ink dot and the dye concentration of the ink, but can be adjusted within a predetermined allowable range.

According to the experiments performed by the inventors, when the reflection density of the higher density ink dot at 100% deposition is assumed to be OD1, the reflection density of the medium density ink dot at 100% deposition is assumed to be OD2 and the reflection density of the lower density ink dot at 100% deposition is assumed to be OD3, and when the dye concentration of the higher density ink is assumed to be D1, the dye concentration of the medium density ink is D2 and the dye concentration of the lower density ink is assumed to be D3, desired effect can be obtained without any significant problem in the actually printed image by satisfying the following expressions:

Reflection Density of Medium Density Ink: 0.53× OD1≦OD2≦0.8×OD1 or Dye Concentration of Medium Density Ink: 0.26× D1≦D2≦0.4×D1

Reflection Density of Lower Density Ink: 0.26× OD1≦OD3≦0.4×OD1 or Dye Concentration of Lower Density Ink: 0.13× D1≦D3≦0.2×D1

As can be appreciated from the shown embodiment and the first embodiment, it should be similar even in the case where four kinds or more of inks in one color are employed. In general, assuming that number of kinds of inks having different densities in one color is C and reflection densities upon depositing the inks of one color but different densities on a predetermined printing medium are respectively OD1, OD2, ... ODN, ... ODC in descending order, the granular appearance in the transition of densities can be reduced in good balance and smooth image with no roughness can be printed in all gradation level when the following expression is satisfied.

$$[(C+1-N)/(1.25 \times C)] \times OD1 \leq ODN \leq [(C+1-N)/(0.83 \times C)] \times OD1$$

wherein (N=2 to C)

Furthermore, assuming that the number of kinds of inks having different densities in one color is C and the dye concentration of the various density levels of inks are respective D1, D1, ... DN, ... DC in descending order, the foregoing reflection density can be satisfied by adjusting the dye concentrations in respective inks to satisfy the following expression.

$$[(C+1-N)/(1.25 \times 2 \times C)] \times D1 \leq DN \leq [(C+1-N)/(0.83 \times 2 \times C)] \times D1$$

wherein (N=2 to C)

Further Description

It is readily understood that the present invention can be effectively applied to any type of printing apparatus employing a plurality of kinds of printing agents of one color with mutually different densities, not limited to the above described ink-jet printing apparatus. The present invention can be also applied to an ink-jet print apparatus which can modulate a reflection density of a forming image employing a diluting agent, a fixing agent, a topcoating agent or the like along with an ink as a printing agent, not limited to the above ink-jet printing in which dye concentrations of inks are selected for the purpose of obtaining the desirable reflection densities.

Though there are various types of ink-jet recording (printing) apparatus including an electro-mechanical transducer element and the like, the present invention achieves remarkable effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

As set forth above, according to the present invention, upon performing printing using a plurality of kinds of inks having different densities in one color, granular appearance in the transition portion of respective density can be reduced substantially uniformly to permit printing of smooth image without roughness in all gradation levels.

What is claimed is:

1. A printing apparatus comprising:

means for performing printing employing a plurality of kinds of printing agents respectively having different reflection densities on a print medium in one color; and means for causing said printing means to satisfy the following expression:

$$[(C+1-N)/(1.25 \times C)] \times OD1 \leq ODN \leq [(C+1-N)/(0.83 \times i\ C)] \times OD1$$

wherein (N=2 to C), the number of kinds of printing agents is C and reflection densities upon depositing a predetermined amount of said printing agents on a predetermined print medium are respectively OD1, OD2, . . . ODN, . . . , ODC in descending order.

2. A printing apparatus as claimed in claim 1, wherein a plurality of printing agents of different colors are employed and a plurality of kinds of printing agents having mutually different reflection densities on said print medium are employed in at least one of said colors.

3. A printing apparatus as claimed in claim 2, wherein said printing agent is an ink.

4. A printing apparatus as claimed in claim 3, wherein a printing head is employed in said printing means by ejecting an ink as said printing agent toward said print medium.

5. A printing apparatus as claimed in claim 4, wherein said printing head includes an electrothermal transducer element generating thermal energy for causing film boiling in the ink for causing ejection of said ink.

6. A printing method comprising the steps of:

performing printing employing a plurality of kinds of printing agents respectively having different reflection densities on a printing medium in one color; and causing printing to be performed to satisfy the following expression:

$$[(C+1-N)/(1.25 \times C)] \times OD1 \leq ODN \leq [(C+1-N)/(0.83 \times C)] \times OD1$$

wherein (N=2 to C), the number of kinds of printing agents is C and reflection densities upon depositing a predetermined amount of said printing agents on a predetermined print medium are respectively OD1, OD2, . . . ODN, . . . , ODC in descending order.

7. A printing method as claimed in claim 6, wherein a plurality of printing agents of different colors are employed and a plurality of kinds of printing agents having mutually different reflection densities on said print medium are employed in at least one of said colors.

8. A printing method as claimed in claim 7, wherein said printing agent is an ink.

9. A printing method as claimed in claim 8, wherein a printing head is employed for performing printing by ejecting an ink as said printing agent toward said print medium.

10. A printing method as claimed in claim 9, wherein said printing head includes an electrothermal transducer element generating thermal energy for causing film boiling in the ink for causing ejection of said ink.

* * * * *

UNITED STATES PATENT AND TRADEMARK OFFICE
CERTIFICATE OF CORRECTION

PATENT NO.    : 5,926,191
DATED         : July 20, 1999
INVENTOR(S)   : Daigoro Kanematsu, et al.

It is certified that error appears in the above-identified patent and that said Letters Patent is hereby corrected as shown below:

Title Page:
Item [57] Abstract
Line 16, "included the" should read -- included in the --.

In the Disclosure:

Column 1:
Line 24, "Amongst, the ink-jet type printing system has features of" should read
-- Among the features of the ink-jet type printing system are, --.

Column 2:
Line 62, "being" should be deleted.

Column 3:
Line 20, "being" should be deleted.
Line 22, "[ ( C+1-N) / (1.25x2C) ] xD1≤DN≤ [ (C+1-N) / (0.83x2xC) ]xD" should read
-- [ (C+1-N) / (1.25x2 C) ]xD1≤DN≤ [ (C+1-N) / (0.83x2xC) ] xD1 --.
Line 48, "being" should be deleted.

Column 4:
Line 48, "is" should read -- are --.

Column 8:
Line 64, "mutually" should read -- mutual --.

Column 9:
Line 19, "an" should read -- a --.
Line 23, "an" should read -- a --.
Line 39, "of respective of the higher" should read -- of respective higher --.
Line 40, "the" (both occurrences) should be deleted.

UNITED STATES PATENT AND TRADEMARK OFFICE
CERTIFICATE OF CORRECTION

PATENT NO.     : 5,926,191
DATED          : July 20, 1999
INVENTOR(S)    : Daigoro Kanematsu, et al.

Page 2 of 2

It is certified that error appears in the above-identified patent and that said Letters Patent is hereby corrected as shown below:

Column 10:
Line 39, "colors" should read -- color --.

Column 13:
Line 45, " $[ (C+1-N) / (1.25xC) ] xOD1 \leq ODN \leq [ ( C+1-N) / (0.83xiC) ] xOD1$" should read -- $[ (C+1-N) / (1.25xC) ] xOD1 \leq ODN \leq [ ( C+1-N) / ( 0.83xC) ] xOD1$ --.

Signed and Sealed this

Fourth Day of September, 2001

*Attest:*

NICHOLAS P. GODICI
*Attesting Officer*      *Acting Director of the United States Patent and Trademark Office*